Dec. 17, 1929.                K. BEHN                 1,739,569
                            MUSICAL TOY
                         Filed Dec. 21, 1928

INVENTOR
K. BEHN

Patented Dec. 17, 1929

1,739,569

UNITED STATES PATENT OFFICE

KARL BEHN, OF ALFELD-LEINE, GERMANY

MUSICAL TOY

Application filed December 21, 1928, Serial No. 327,702, and in Germany August 14, 1928.

This invention relates to a musical toy wherein different sounds may be selectively produced and pictorial representations in accordance with the sounds simultaneously brought into view.

The primary object of the present invention is the provision of a musical toy in the form of a piano, the keys of which when operated compel the production of a sound, such for example as the characteristic sound emitted by an animal, the construction including means whereby a picture of the animal corresponding to the particular key is brought into view during the operation of the key.

The invention is illustrated in the accompanying drawings in which.

Figure 1:
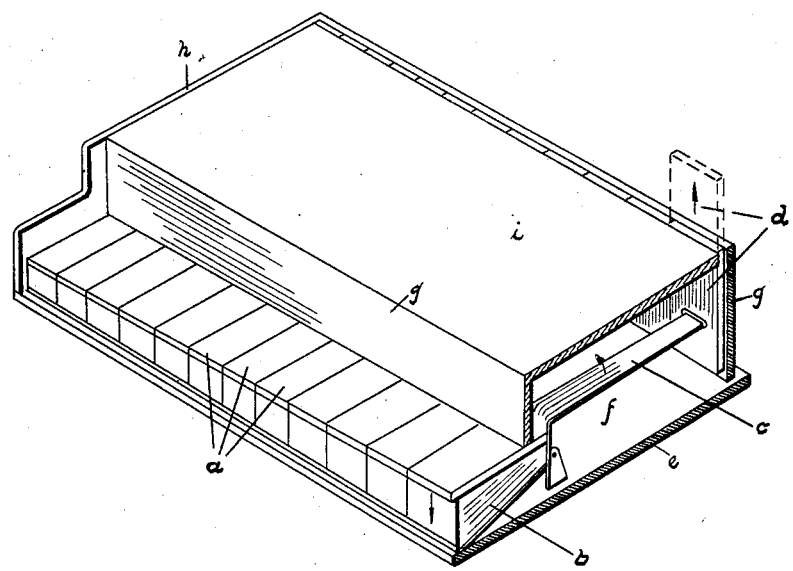
Figure 1 is a perspective view, partly in section, of a toy constructed in accordance with the present invention.
Figure 2:
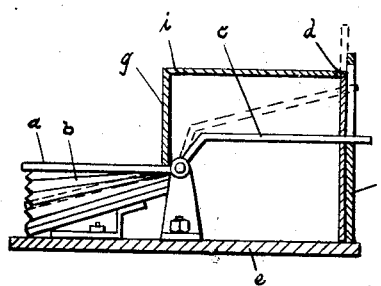
Figure 2 is a cross section of the musical toy.

As illustrated, the improved toy comprises a base $e$ on which is supported a sound chamber $f$ formed by front and rear walls $g$, side walls $h$, and a top wall $i$, the side walls $h$ and base $e$ being continued forwardly of the front wall $g$.

Supported for swinging movement in the space forwardly of the front wall $g$ of the sound chamber and between the extensions of the side walls $h$ thereof are a series of keys $a$ which are arranged to simulate a piano keyboard.

Underlying each key is a bellows $b$, and sound-controlling devices of any usual or conventional form are arranged to cooperate with each bellows so that on the depression of a particular key, a sound will be emitted from the sound device of the particular bellows which, amplified in the sound chamber, will be of sufficient loudness and distinctness to more or less clearly simulate the sound emitted by a particular animal.

It is contemplated and preferred that the sound producing devices cooperating with the bellows shall be duplicated, so that a sound will be produced on the depression of the key and the collapse of the corresponding bellows, that is on the ejection of air from the bellows, and a further sound will be produced on the release of the key and the expansion of the bellows, that is on the inlet of air to the bellows.

In reproducing animal sounds or simulating such reproduction by the human voice, they are ordinarily of two syllable forms and by thus arranging the sounding devices, a full movement of the key, that is a depression and following upward movement thereof, is necessary to produce the full desired sound.

Supported between the rear wall $g$ of the sound chamber and the top wall $i$ thereof are a series of slides $d$, these slides being arranged in alignment with the respective keys $a$. Connecting each key with its particular slide is a bar $c$, the free end of which enters a slot in the slide. On one or both faces of the slides $d$, or if desired on that face next the sound chamber, there will be a representation of the animal whose vocal reproduction is simulated by the depression of the particular key. Thus, as a key is depressed and released, a sound is made and the picture of the corresponding animal is brought into view by the simultaneous upward movement of the particular slide.

The keys are so arranged that the sounds produced are as nearly as possible chromatically disposed, thereby permitting children in using the toy to compose and play little songs of animal voices.

What is claimed to be new is:

A musical toy simulating a piano and having a series of keys and a sound chamber in rear of the keys, a bellows underlying each key and designed to operate sound devices on the depression of a key, a slide mounted in rear of the sound chamber and normally concealed thereby, the slide bearing a pictorial representation related to the sound produced by a particular key, and a bar connecting such key and the particular slide, whereby the slide is operated in the operation of the key and simultaneously with the operation of the bellows to produce the desired sound.

In testimony whereof I affix my signature.

KARL BEHN. [L. S.]